US010242275B1

United States Patent
Chan et al.

(10) Patent No.: US 10,242,275 B1
(45) Date of Patent: *Mar. 26, 2019

(54) SYSTEMS AND METHODS FOR ASSOCIATING VEHICLE OPERATORS WITH DRIVING MISSES INDICATED IN VEHICLE OPERATION DATA

(71) Applicant: State Farm Mutual Automobile Insurance Company, Bloomington, IL (US)

(72) Inventors: Aaron Scott Chan, Bloomington, IL (US); Kenneth Jason Sanchez, San Francisco, CA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,055

(22) Filed: Jul. 27, 2018

Related U.S. Application Data

(63) Continuation of application No. 15/867,384, filed on Jan. 10, 2018, which is a continuation of application No. 15/488,094, filed on Apr. 14, 2017, now Pat. No. 9,886,638, which is a continuation of application No. 14/989,524, filed on Jan. 6, 2016, now Pat. No. 9,685,010.

(51) Int. Cl.
  *G06K 9/00* (2006.01)
  *G07C 5/02* (2006.01)
  *G07C 5/00* (2006.01)

(52) U.S. Cl.
  CPC ..... *G06K 9/00845* (2013.01); *G06K 9/00805* (2013.01); *G06K 9/00885* (2013.01); *G07C 5/008* (2013.01); *G07C 5/02* (2013.01)

(58) Field of Classification Search
  USPC ............................................ 382/104
  See application file for complete search history.

(56) References Cited

U.S. PATENT DOCUMENTS

| | | | | |
|---|---|---|---|---|
| 6,037,860 A | * | 3/2000 | Zander | B60W 30/09 307/10.1 |
| 6,141,611 A | * | 10/2000 | Mackey | G07C 5/008 340/438 |
| 7,659,827 B2 | * | 2/2010 | Gunderson | G08G 1/16 340/576 |

(Continued)

OTHER PUBLICATIONS statefarm.com, "Driver Feedback TM" (2016) Retrieve from the Internet on Apr. 27, 2016: https://www.statefarm.com/customer-care/download-mobile-apps/driver-feedback.

*Primary Examiner* — Ishrat I Sherali

(57) ABSTRACT

Systems and methods for assessing vehicle operation are provided. According to certain aspects, an electronic device may receive and analyze image data depicting an individual located within a vehicle. The electronic device may also access and compile vehicle operation data and operator data corresponding to a state or condition of the vehicle operator. The electronic device may identify, from the vehicle operator data, a set of close misses experienced by the vehicle, correlate the set of close misses with a state or condition of the vehicle operator, and attribute at least some of the close misses to the vehicle operator. A remote server may aggregate and compile corresponding data from a plurality of vehicles.

18 Claims, 5 Drawing Sheets

(56) References Cited

U.S. PATENT DOCUMENTS

| | | | | |
|---|---|---|---|---|
| 7,676,306 B2* | 3/2010 | Kubo | ............... | G07C 5/0858 701/32.3 |
| 8,140,359 B2* | 3/2012 | Daniel | ............... | G06Q 40/00 705/35 |
| 8,452,502 B2* | 5/2013 | Katayama | ............ | G07C 5/0858 340/436 |
| 8,738,523 B1* | 5/2014 | Sanchez | ............ | G06Q 40/00 705/39 |
| 8,892,310 B1* | 11/2014 | Palmer | ............... | G07C 5/008 701/41 |
| 8,952,819 B2* | 2/2015 | Nemat-Nasser | ..... | B60K 28/066 340/425.1 |
| 8,954,340 B2* | 2/2015 | Sanchez | ............ | G06Q 40/00 600/300 |
| 9,296,299 B2* | 3/2016 | Ricci | ................... | H04W 4/90 |
| 9,535,878 B1* | 1/2017 | Brinkmann | ............ | G06F 17/00 |
| 2010/0225738 A1* | 9/2010 | Webster | ............... | B60R 11/04 348/36 |
| 2014/0129113 A1* | 5/2014 | Van Wiemeersch | .... | F02D 28/00 701/102 |
| 2014/0129301 A1* | 5/2014 | Van Wiemeersch | ... | G07B 15/02 705/13 |
| 2015/0112731 A1* | 4/2015 | Binion | ............... | G06Q 40/08 705/4 |
| 2016/0046298 A1* | 2/2016 | DeRuyck | ............ | B60W 40/09 340/576 |
| 2016/0371788 A1* | 12/2016 | Rackley, III | ....... | G06Q 30/0645 |

* cited by examiner

SYSTEMS AND METHODS FOR ASSOCIATING VEHICLE OPERATORS WITH DRIVING MISSES INDICATED IN VEHICLE OPERATION DATA

CROSS-REFERENCE TO RELATED APPLICATIONS

The present application is a continuation of, and claims the benefit of, U.S. patent application Ser. No. 15/867,384, filed Jan. 10, 2018, which is a continuation of, and claims the benefit of, U.S. patent application Ser. No. 15/488,094, filed Apr. 14, 2017 (now U.S. Pat. No. 9,886,638), which is continuation, and claims the benefit of, U.S. patent application Ser. No. 14/989,524, filed Jan. 6, 2016 (now U.S. Pat. No. 9,685,010). The disclosures of these applications are hereby fully incorporated by reference in their entireties.

FIELD

The present disclosure is directed to detecting and recording parameters associated with vehicle operation. More particularly, the present disclosure is directed to systems and methods for associating vehicle operators with certain driving events indicated in vehicle operation data.

BACKGROUND

Individuals have been operating and traveling in vehicles as a means of transportation for decades. Generally, some drivers exercise more care or caution than do other drivers. In particular, some drivers consistently operate vehicles above the posted speed limit, which may result in the drivers having to navigate through or handle obstacles within a shorter time window. For example, if a driver is speeding, the driver may have to swerve more suddenly or turn more sharply than a driver who is obeying the posted speed limit.

Recently, vehicles have experienced an increased prevalence of electronic devices and sensors capable of sensing and generating data associated with vehicle operation. However, even with this increasing prevalence, there are no existing solutions for determining when specific drivers are operating vehicles in certain situations. For example, there is no existing solution for determining when a vehicle operator experiences a "close miss." Accordingly, there is an opportunity for systems and methods to leverage various data to identify vehicle operators and record when those vehicle operators experience "close misses."

SUMMARY

In one aspect, a computer-implemented method in an electronic device of assessing vehicle operation is provided. The method may include receiving image data from at least one image sensor located within the vehicle; analyzing, by a computer processor, the image data to identify an operator of the vehicle; accessing (i) vehicle operation data associated with operation of the vehicle, and (ii) operator data associated with at least one condition of the operator; and analyzing, by the computer processor, the vehicle operation data and the operator data, including: identifying, from the vehicle operation data, a set of close misses experienced by the vehicle during the operation of the vehicle, correlating the set of close misses to the operator data, and based on the correlating, attributing at least a portion of the set of close misses to the operator. The method may further include recording an indication of at least the portion of the set of close misses and an identification of the operator of the vehicle.

In another aspect, a system in an electronic device for assessing vehicle operation is provided. The system may include a memory configured to store non-transitory computer executable instructions, and a processor configured to interface with the memory. The processor may be configured to execute the non-transitory computer executable instructions to cause the processor to receive image data from at least one image sensor located within the vehicle, analyze the image data to identify an operator of the vehicle, access (i) vehicle operation data associated with operation of the vehicle, and (ii) operator data associated with at least one condition of the operator, and analyze the vehicle operation data and the operator data, including: identify, from the vehicle operation data, a set of close misses experienced by the vehicle during the operation of the vehicle, correlate the set of close misses to the operator data, and based on the correlating, attribute at least a portion of the set of close misses to the operator. The processor may further be configured to record an indication of at least the portion of the set of close misses and an identification of the operator of the vehicle.

DETAILED DESCRIPTION

Figure 1A:
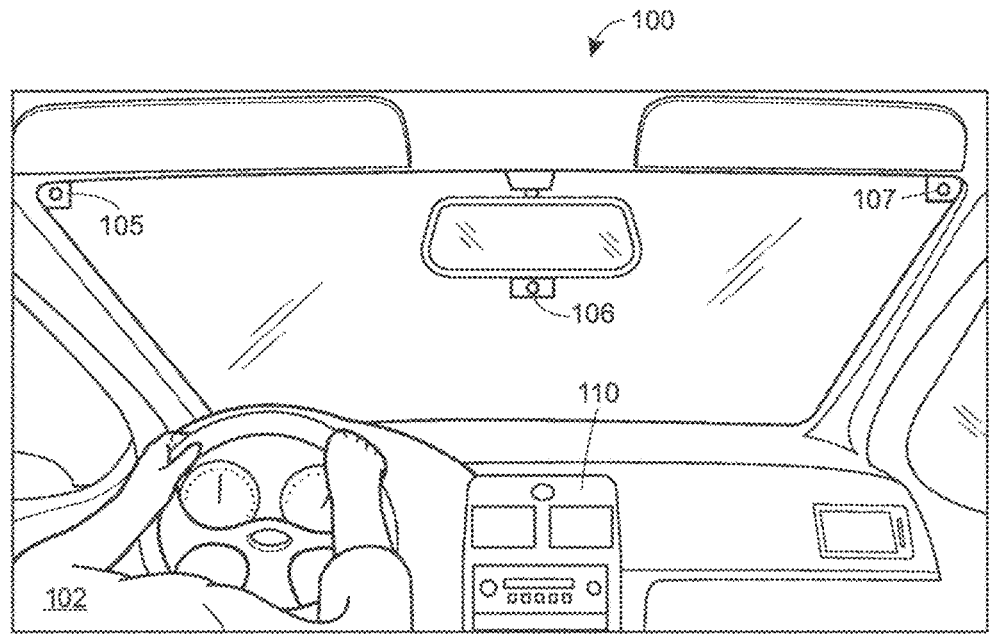
FIGS. 1A and 1B depict exemplary environments within a vehicle including various components configured to facilitate various functionalities, in accordance with some embodiments.

The present embodiments may relate to, inter alia, detecting, recording, and compiling various vehicle operation data. Existing vehicle operation environments support the generation of various vehicle operation data. However, there is no way to properly compile the vehicle operation data with certain associations or pairings in a meaningful manner to enable the data to be effectively analyzed and used for subsequent applications or inspections. The present embodiments improve these shortcomings by effectively and efficiently organizing the vehicle operation data for subsequent retrieval and/or analysis.

According to certain aspects, a vehicle or an electronic device within the vehicle may be equipped with one or more image sensors. The image sensor(s) may be configured to capture image data of an operator (or a passenger(s)) of the vehicle and transmit the captured image data to an electronic device. After receiving the image data, the electronic device may access stored user profile data that may include physical characteristics of a set of users. The electronic device may analyze the received image data by comparing the received image data to the stored user profile data to identify an individual depicted in the received image data, where the individual may be an operator of the vehicle.

Further, the electronic device may determine, identify, or access certain vehicle operation data, including various sensor data gathered by one or more sensors of the vehicle as well as sensor data detected by one or more sensors of the electronic device. The electronic device may also determine, identify, or access operator data associated with one or more conditions of an operator of the vehicle. The vehicle operation data may include or indicate a set of driving events, whereby a driving event may be any occurrence of a distinct vehicle movement or maneuver. Some of the driving events may be classified as "close misses" which may constitute an occurrence in which the vehicle narrowly avoids or misses an obstacle or an accident. For example, a close miss may be indicated by a "hard turn," "a swerve", or a "hard brake."

The electronic device may correlate the vehicle operation data with the operator data to assess potential causes of the close misses. In particular, the electronic device may determine whether any identified conditions, movements, or the like associated with the operator may have caused or led to any of the close misses. The electronic device may accordingly attribute one or more of the close misses to the vehicle operator (i.e., the electronic device may deem that the vehicle operator was at fault for one or more of the close misses). Additionally, the electronic device may further store the data by, for example, generating a vehicle operation log that may indicate the individual and any determined close misses.

The systems and methods therefore offer numerous benefits. In particular, the individual may review the vehicle operation log to review or recall certain information, or to analyze certain information in an attempt to make various improvements (e.g., improve a habit for speeding). Further, an individual, entity, or the like may access the vehicle operation log for various purposes or applications. For example, an insurance provider may access the vehicle operation log and, based on the data included in the vehicle operation log, may determine a risk profile for the vehicle operator according to the determined amount of close misses. For further example, a parent may access the vehicle operation log to monitor vehicle travel by one or more children. It should be appreciated that other benefits are envisioned.

The systems and methods discussed herein address a challenge that is particular to vehicle operation. In particular, the challenge relates to a difficulty in interpreting the multiple types of data associated with operating vehicles. This is particularly apparent with the increasing amount of vehicle sensors and types of data generated therefrom. In conventional environments, the data is generated and reviewed without any sort of data correlation or log generation. In contrast, the systems and methods automatically correlate certain types of data as the data is recorded or generated, which results in effectively compiled data that may be used for various applications and interpretations. Therefore, because the systems and methods employ the collection, compiling, and storing of data associated with vehicle, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data in combination with stored user profile data to identify individual(s) depicted in the image data, access vehicle operation data and operator data, and analyze the vehicle operation data and the operator data to determine close misses and correlate the close misses with the operator data. This combination of elements further impose meaningful limits in that the operations are applied to improve vehicle data compiling by associating multiple types of distinct data in a meaningful and effective way.

According to implementations, the systems and methods may support a dynamic, real-time or near-real-time analysis of any captured, received, and/or detected data. In particular, the electronic device may receive or capture image data in real-time or near real-time, and may automatically and dynamically analyze the captured image data by comparing the captured image data to stored profile data. The electronic device may also receive or access certain vehicle operation data and operator data in real-time or near-real-time, and may automatically and dynamically associate and/or compile the image data, the vehicle operation data, and the operator data. In this regard, the individual indicated in the data or accessing the data is afforded the benefit of an accurate and meaningful compilation of data. Further, any individual may access and analyze the data in real-time or near-real-time to efficiently and effectively facilitate any functionalities or processing.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100.

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. The set of sensors may also be configured to detect various conditions of the individual 102, including various biometric information, movements, and/or the like.

Figure 1B:
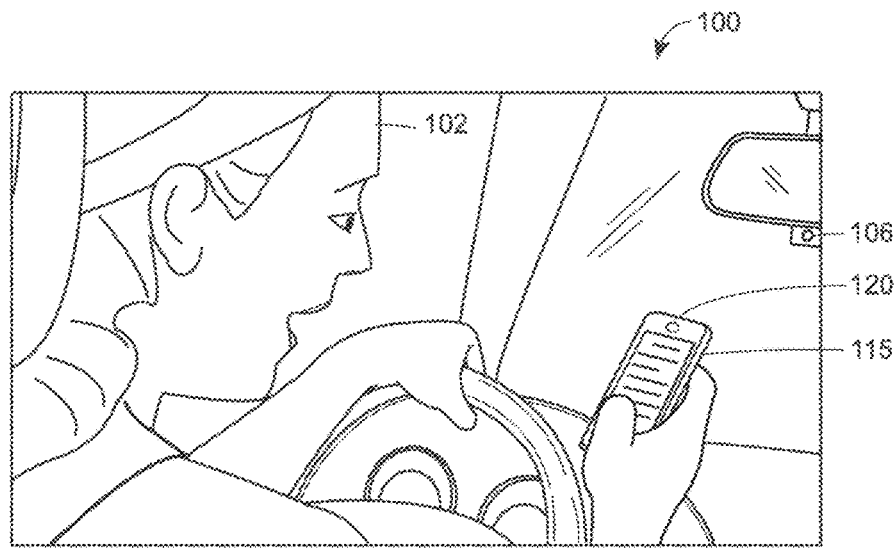

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle. The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, biometric, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data.

The electronic devices 110, 115 may further interface with the various sensors or other components to assess real-time operation data associated with the vehicle 100. For example, the real-time vehicle operation data may include any sensor data from the yaw rate sensor, the tilt sensor, the steering angle sensor, the brake sensor, and/or any other sensor. Further, the electronic devices 110, 115 may access supplemental movement data from additional sensors, such as the location module, the gyroscope, and/or the accelerometer of the electronic device 115. According to embodiments, the real-time vehicle operation data and/or the supplemental movement data may include or indicate a set of driving events corresponding to operation of the vehicle. The electronic devices 110, 115 may also access operator data from various sensors (including one or more of the image sensors 105, 106, 107), where the operator data indicates various condition(s) or movement(s) of the individual 102.

The electronic devices 110, 115 may additionally communicate with remote components via one or more network connections to retrieve additional information related to the environment of the vehicle 100. In particular, the electronic devices 110, 115 may retrieve operation parameters specific to a make and model of the vehicle 100. The electronic devices 110, 115 may analyze the vehicle operation data, and optionally the supplemental movement data and/or the operation parameters, to determine an amount of close misses experienced by the vehicle during its operation. According to embodiments, the close misses may be a subset of the set of driving events included in the real-time operation data and/or the supplemental movement data. Further, in embodiments, the electronic devices 110, 115 may determine the close misses as an occurrence when a certain portion of the gathered data meets or exceeds a predetermined threshold.

The electronic devices 110, 115 may also correlate the identified close misses with the operator data to determine if certain operator conditions or movements may have caused or otherwise been a contributing factor to any of the close misses. Additionally, based on the correlation, the electronic devices 110, 115 may attribute any of the close misses to the individual 102. In particular, the electronic devices 110, 115 may deem that the individual 102 was at fault or partly at fault for any of the close misses.

The electronic devices 110, 115 may also generate a vehicle operation log that may indicate the identified individual and may include any of the received or accessed vehicle operation data, where the vehicle operation log may be later accessed and examined for various applications. In a particular embodiment, the electronic devices 110, 115 may record instances of any close misses during operation of the vehicle 100 by the individual 102, as well as any details related to the close misses (e.g., time, location, and type of close miss). The electronic devices 110, 115 may also provide, in real-time, near real-time, or at another time, the generated vehicle operation log to a third party entity or device (e.g., an insurance provider).

According to embodiments, an individual may manually access and examine the vehicle operation log, or a computing device may automatically access and examine the vehicle operation log, to facilitate the various applications. For example, an insurance provider may automatically analyze the vehicle operation log to assess the amount of close misses for which a driver is responsible, and may generate a vehicle insurance policy quote accordingly. Accordingly, the insurance provider may generate the vehicle insurance policy quote in real-time or near-real-time to when the electronic device 110, 115 generates the vehicle operation log. Further, the insurance provider may provide the vehicle insurance policy quote to the individual 102, such as when the individual 102 is still operating the vehicle or otherwise in real-time or near-real-time to generation of the vehicle operation log, where the individual 102 may select to purchase the vehicle insurance policy.

Figure 2:
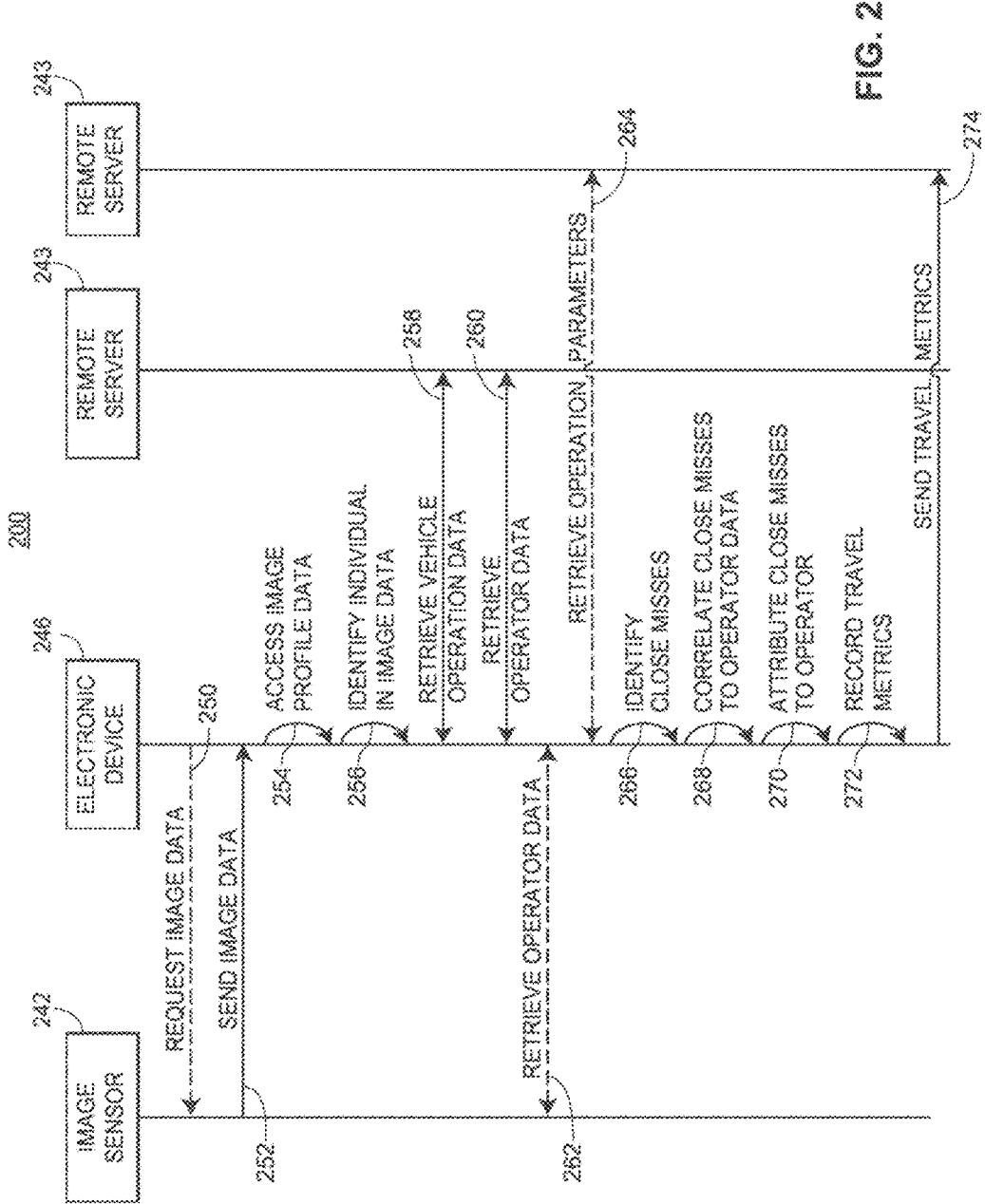
FIG. 2 depicts an exemplary signal diagram associated with analyzing data to identify vehicle operators and close misses, in accordance with some embodiments.

FIG. 2 depicts a signal diagram 200 associated with facilitating certain functionalities associated with the systems and methods. The signal diagram 200 includes a set of components that may be associated with a vehicle: an image sensor 242 (such as one of the image sensors 105, 106, 107, 120 as discussed with respect to FIGS. 1A and 1B), an electronic device 246 (such as one of the electronic devices 110, 115 as discussed with respect to FIGS. 1A and 1B), a set of vehicle sensors 241, and a remote server 243. According to embodiments, the image sensor 242 may be a component of (or separate from) the electronic device 246. Further, according to embodiments, the set of vehicle sensors 241 may include a yaw rate sensor, a tilt sensor, a steering angle sensor, a brake sensor, a location module (e.g., a GPS module), and/or any additional sensor capable of measuring the movement or general operation of a vehicle. Additionally, the set of vehicle sensors 241 may include sensors capable of measuring operator data including physiological data regarding the vehicle operator such as, for example, a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

The signal diagram 200 may begin when the electronic device 246 optionally requests (250) image data from the image sensor 242. According to embodiments, the electronic device 246 may automatically request the image data periodically (e.g., once every ten seconds, once every minute, once every hour), or a user of the electronic device 246 may cause the electronic device 246 to request the image data. Further, the request may include a specified amount of image data and/or a specific time component (e.g., real-time image(s), real-time video, image(s) and/or video recorded five minutes ago). It should be appreciated that the image sensor 242 may be internal to or external from the electronic device 246.

The image sensor 242 may send (252) the image data to the electronic device 246. In one implementation, the image sensor 242 may automatically send the image data to the electronic device 246 in real-time or near real-time as the image sensor 242 captures the image data, and/or in response to a request from the electronic device 246. In another implementation, the image sensor 242 may send previously-captured image data to the electronic device 246, such as if the image sensor 242 interfaces with some type of memory or storage. It should be appreciated that the image data may depict a vehicle operator or a passenger of the vehicle.

The electronic device 246 may access (254) image profile data associated with one or more individuals. In embodiments, the one or more individuals may be registered or otherwise associated with the vehicle (e.g., one or more registered drivers of the vehicle). The electronic device 246 may access the image profile data from local memory or from remote storage via a network connection. In one implementation, the electronic device 246 may access the image profile data from the remote server 243. According to embodiments, the image profile data may include a set of attributes, characteristics, and/or the like that may be related to the one or more individuals. For example, the image profile data may include facial recognition data related to relative positions, sizes, and/or shapes of the eyes, noses, cheekbones, jaws, and/or other features of the one or more individuals.

The electronic device 246 may identify (256) an individual depicted in the image data based on an analysis of the received image data and the accessed image profile data. According to the embodiments, the individual depicted in the image data may be the vehicle operator or a passenger of the vehicle, where the electronic device 246 may discern whether the individual is the vehicle operator or a passenger based on a positioning of the individual as indicated in the image data. In one implementation, the electronic device 246 may perform a facial recognition algorithm or technique using the received image data to determine that the facial features of an individual depicted in the received image data matches those corresponding to an individual included in the image profile data. It should be appreciated that other types of calculations, algorithms, comparisons, or techniques are envisioned.

The electronic device 246 may retrieve (258) vehicle operation data from the vehicle sensors 241. In particular, the vehicle operation data may include one or more of the following: an angular velocity reading from the yaw rate sensor, a pitch and/or roll from the tilt sensor, a position angle of the steering wheel and a rate of turn from the steering angle sensor, and/or braking data from the brake sensor. It should be appreciated that additional or alternative types of sensor data from various sensors are envisioned (e.g., speed data from a speedometer). According to embodiments, the electronic device 246 may automatically request the vehicle operation data periodically (e.g., once every ten seconds, once every minute, once every hour), or a user of the electronic device 246 may cause the electronic device 246 to request the vehicle operation data. Further, the request may include a specified amount of vehicle operation data and/or a specific time component (e.g., real-time data or data recorded five minutes ago).

In other embodiments, one or more of the vehicle sensors may automatically send the corresponding vehicle operation data to the electronic device 246 in response to a trigger event, such as when the corresponding sensor data meets or exceeds a threshold amount. For example, if the tilt sensor senses a pitch or roll that exceeds a threshold value, then the tilt sensor may provide the pitch and/or roll value to the electronic device 246.

The electronic device 246 may optionally access various movement data. In particular, the electronic device 246 may access the movement data from various local sensors including a location module, an accelerometer, a gyroscope, and/or the like. Similar to retrieving the vehicle operation data in (248), the electronic device 246 may request a specified amount of movement data and/or a specific time component (e.g., real-time data or data recorded five minutes ago). According to some embodiments, the electronic device 246 may supplement the vehicle operation data with the movement data.

The electronic device 246 may also retrieve (260) operator data from one or more of the vehicle sensors 241. In embodiments, the operator data may include various physiological data regarding the vehicle operator such as, for example, a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data.

In an optional implementation, the electronic device 246 may retrieve (262) additional or alternative operator data from the image sensor, which may be in the form of additional image data that additionally depicts the vehicle operator. For example, the additional image data may depict eye-tracking movements, head-tracking movements, gesture-tracking movements, operator posture, and/or other visual data that indicates operator movements or behaviors. In an embodiment, the electronic device 246 may analyze the image data received in (252) to identify the operator movements or behaviors, in addition to or in lieu of retrieving the additional image data.

The electronic device 246 may also optionally retrieve (264) certain operation parameters from the remote server 243 via a network(s). In certain embodiments, the network(s) may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) may also be one or more private or local networks or dedicated frequency bands. The operation parameters may be certain thresholds or other metrics that the electronic device 246 may use to analyze the vehicle operation data and/or the operator data, where the operation parameters may be based on the type of vehicle, year of manufacture, condition of the vehicle, and/or other data.

The electronic device 246 may analyze the vehicle operation data to identify (266) any close misses experienced by the vehicle. In an implementation, the electronic device 246 may further incorporate the operation parameters retrieved in (264) to analyze the vehicle operation data. In analyzing the vehicle operation data and optionally the operation parameters, the electronic device 246 may identify a set of driving events included in the data. According to embodiments, the set of driving events may correspond to a set of movements or maneuvers that the vehicle undertakes or completes. For example, one of the driving events may be a right turn, and another of the driving events may be an instance of the vehicle braking.

In an implementation, the set of driving events may correspond to the vehicle operation data meeting or exceeding a threshold value. For example, one driving event may correspond to the rate of turn from the steering wheel sensor exceeding a certain value (which may correspond to a swerve). For further example, another driving event may correspond to the angular velocity reading from the yaw rate sensor exceeding a certain value (which may correspond to a hard turn). Additionally, for example, another driving event may correspond to the braking data from the brake sensor exceeding a certain value coupled with a rapid deceleration in speed (which may correspond to a hard brake event).

The electronic device 246 may thus identify the close misses from the identified driving events. According to embodiments, a close miss may be defined as an instance or occurrence in which the vehicle quickly and/or suddenly adjusts its operation, which may result in the vehicle narrowly avoiding or missing an obstacle or an accident. For example, a close miss may be a strong braking event, a sharp steering event, a hard swerve, a high acceleration, a fast cornering, an excessive swaying, an erratic steering, a driving on the wrong side of the road, and/or other similar instance. Further, the amount of close misses may be an absolute number of close misses that are associated with the gathered data. For example, the electronic device 246 may determine that there are two (2) close misses included in the vehicle operation data resulting from the last three (3) hours of vehicle operation.

In some embodiments, the close misses may be a portion or all of the set of driving events resulting from the analysis of (266). In particular, a driving event may have a first associated threshold, where a close miss may have a different associated threshold. For example, a "swerve close miss" may have a higher threshold for the corresponding rate of turn data than does a "swerve driving event." In other implementations, a close miss may have the same threshold(s) as a driving event (i.e., an appropriate driving event may effectively be considered a close miss). It should be appreciated that the electronic device 246 may be configured with the various threshold values and may incorporate different sensitivities in identifying the set of driving events and determining the close misses. In some implementations, the electronic device 246 may account for the operation parameters when determining the amount of close misses. For example, the electronic device 246 may consider a hard turn having certain operation data a close miss when the vehicle is a minivan, and may not consider a hard turn having the same operation data a close miss when the vehicle is a 2-door sports car.

The electronic device 246 may correlate (268) the close misses to the operator data retrieved in (258) and (262). In an embodiment, the electronic device 246 may identify an occurrence time of each of the close misses, for example by examining or accessing time stamp data associated with the vehicle operation data. The electronic device 246 may then access the operator data for that particular occurrence time, or for immediately prior to the particular occurrence time, to assess a state of the operator. For example, the operator data may indicate that the operator glanced away from the road immediately prior to completing a hard swerve event. For further example, the operator data may indicate that the operator's eyes were sporadically closed in the time leading up to a hard braking event. As an additional example, the operator data may indicate that the operator was having heart trouble that preceded a sporadic lane change. It should be appreciated that additional scenarios are envisioned.

The electronic device 246 may attribute (270) at least a portion of the close misses to the operator. In particular, the electronic device 246 may determine that the operator is at fault for at least the portion of the close misses. In an embodiment, the electronic device 246 may determine that a certain operator condition or movement occurred immediately prior to a close miss, and may attribute the close miss to the operator. The electronic device 246 may perform the attribution according to various factors such as the timing and/or degree of the operator condition or movement, the timing and/or degree of the close miss, the timing of the operator condition or movement relative to the timing of the close miss, and/or other factors. For example, the electronic device 246 may determine that the operator had a high vocal amplitude immediately prior to the vehicle experiencing a hard turn, and may attribute the hard turn to the operator. For further example, the electronic device 246 may determine that the operator experienced significant head movement prior to a hard braking event.

The electronic device 246 may record (272) any travel metrics associated with operation of the vehicle. In particular, the electronic device 246 may record the close misses determined in (266), which close misses are attributed to the vehicle operator, any particular metrics from the vehicle operation data and/or the movement data, timing data, and/or other information. In embodiments, the electronic device 246 may record the information in the form of a vehicle operator log or similar record that the electronic device 246 may update with new information. In particular, the vehicle operation log may include an identification of the vehicle operator, a current time and/or a current date, a location of the vehicle, any information associated with the amount of close misses and/or the impact thereof (including whether the close misses are attributed to the vehicle operator), and/or any other information. Accordingly, the vehicle operation log may provide an accurate snapshot of operation of the vehicle by the vehicle operator that may be accessed by one or more users or entities. The electronic device 246 may send (274) the travel metrics to the remote server 243, such as via any type of network connection. Accordingly, a user or administrator associated with the remote server 243 may review the travel metrics and facilitate any related functionalities.

According to embodiments, the remote server 243 may aggregate the received data from the electronic device 246 and from any other electronic device or vehicle. Further, the remote server 243 may analyze the compiled data to perform further functionalities or assessments. In particular, the remote server 243 may determine correlations between and among certain user conditions or movements, and certain driving events or close misses. The remote server 243 may further assess a determine a degree for the correlations. In particular, certain correlations may have a stronger correlation than others. The remote server 243 may use this information to improve vehicle design, identify techniques for reducing or improving certain behaviors or conditions, and facilitate other functionalities that generally improve vehicular safety.

Figure 3:
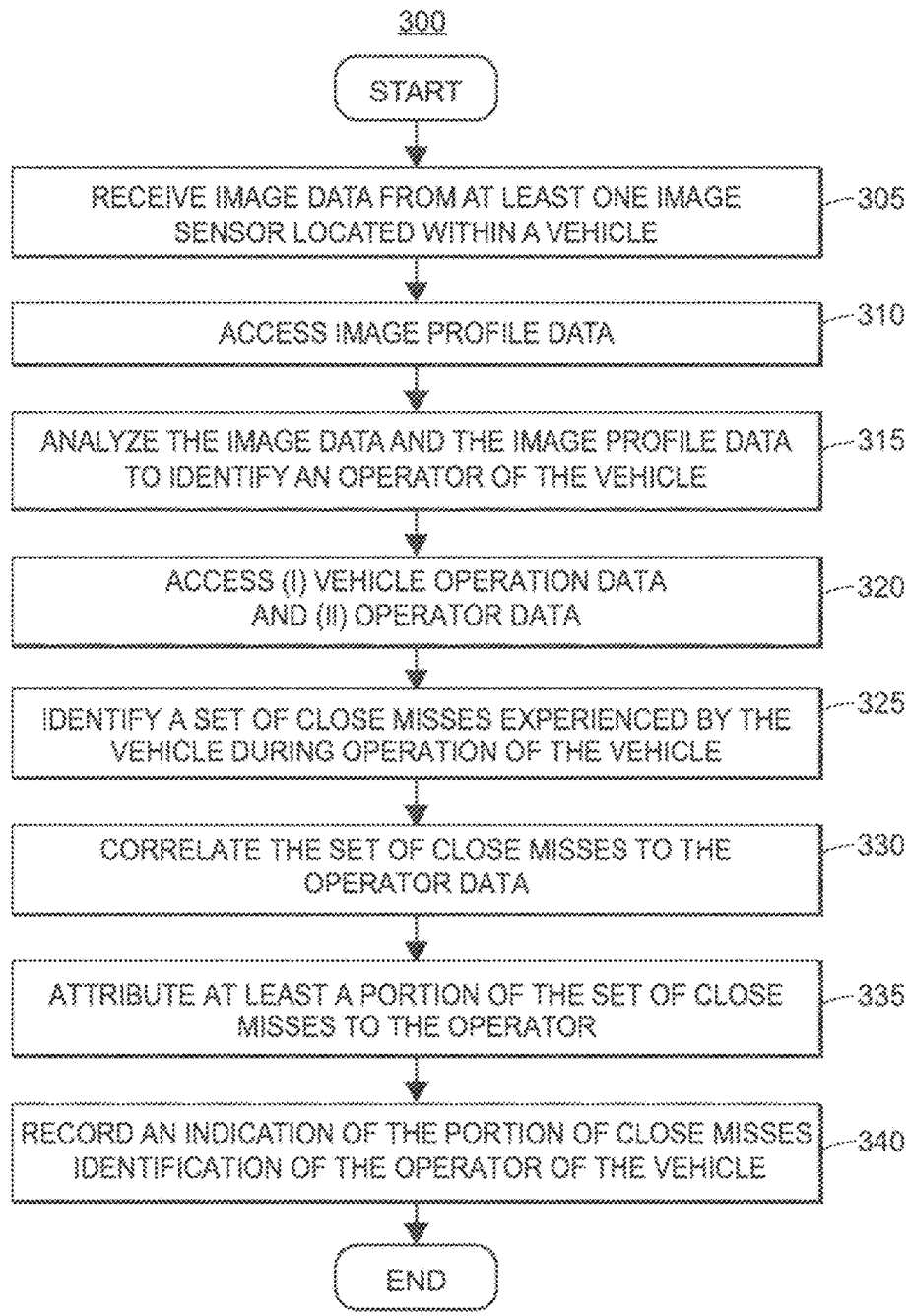
FIG. 3 depicts an exemplary flow diagram associated with analyzing vehicle operation data to identify close misses, in accordance with some embodiments.

FIG. 3 depicts a block diagram of an exemplary method 300 of assessing vehicle operation data. The method 300 may be facilitated by an electronic device that may be located within a vehicle or incorporated as part of the vehicle. The electronic device may support execution of a dedicated application that may facilitate the functionalities of the method 300. Further, the electronic device may enable a user or individual (e.g., an operator of the vehicle) to make various selections and facilitate various functionalities.

The method 300 may begin when the electronic device receives (block 305) image data from at least one image sensor located within the vehicle. In embodiments, the image sensor may be a component of the electronic device itself or may be external to the electronic device. Further, the image data may be received in real-time or near real-time as the at least one image sensor captures the image data. After receiving the image data, the electronic device may access (block 310) image profile data associated with a set of individuals. In some embodiments, the set of individuals may be registered to or otherwise associated with the vehicle. Further, the image profile data may indicate physical characteristics (e.g., facial features) of the corresponding set of individuals.

The electronic device may analyze (block 315) the image data and the image profile data to identify an operator of the vehicle who is depicted in the image data. In one implementation, the electronic device may perform a facial recognition analysis using the image data and the image profile data. It should be appreciated that alternate or additional analyses, techniques, calculations, algorithms, or the like are envisioned. In some embodiments, the electronic device may not have enough relevant data to identify the vehicle operator, in which case processing may return to block 305 at which additional image data may be received, or processing may end or proceed to other functionality.

The electronic device may further access (block 320) (i) vehicle operation data associated with operation of the vehicle and (ii) operator data associated with at least one condition of the operator. In embodiments, the electronic device may access the vehicle operator data by retrieving sensor data from at least one of: a yaw rate sensor, a tilt sensor, a steering angle sensor, a location module, and a brake sensor. Further, the electronic device may access the operator data by accessing at least one of: (i) biometric data associated with the operator, and (ii) additional image data indicating a movement or a position of the operator. The biometric data may be in the form of one or more of: a heart rate, heart rate variability data, a grip pressure, electrodermal activity data, a telematics driving score, a body temperature, an arm movement, a head movement, a vocal amplitude, a vocal frequency, a vocal pattern, a gaze direction, a gaze duration, a head direction, an eyelid opening, a blink rate, pupillometry data, a blood pressure, electroencephalographic data, a respiration rate, a respiration pattern, a galvanic skin response, functional near infrared optical brain imaging data, functional magnetic resonance imaging data, or electromyographic data. Further, the additional image data may be separate from or included with the image data received in block 305.

The electronic device may analyze the vehicle operation data and the operator data. In particular, the electronic device identify (block 325) a set of close misses experienced by the vehicle during the operation of the vehicle. In embodiments, the electronic device may identify a set of instances in which the vehicle operation data exceeds a predetermined threshold, where the set of instances may correspond to the set of close misses. Further, the electronic device may correlate (block 330) the set of close misses to the operator data. In particular, the electronic device may identify, for each of the set of close misses, an occurrence time, and determine a state of the operator immediately prior to each of the occurrence times. Moreover, the electronic device may attribute (block 335) at least a portion of the set of close misses to the operator. In particular, for each of the portion of the set of close misses, the electronic device may determine that the respective state of the operator contributed to the respective close miss.

The electronic device may record (block 340) an indication of the portion of close misses and an identification of the vehicle operator, along with any other vehicle metric data, including a current time, a current date, a current location, route information, a time of operation, and/or any other data including any data or information previously identified or determined. In embodiments, the electronic device may record the data in the form of a vehicle operation log, and may send the vehicle operation log to a remote server.

Figure 4A:
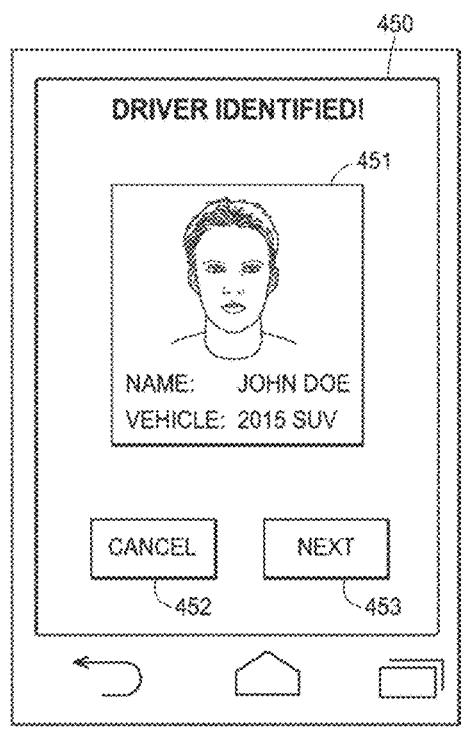
FIGS. 4A and 4B depict exemplary user interfaces associated with generating vehicle operation logs, in accordance with some embodiments.
Figure 4B:
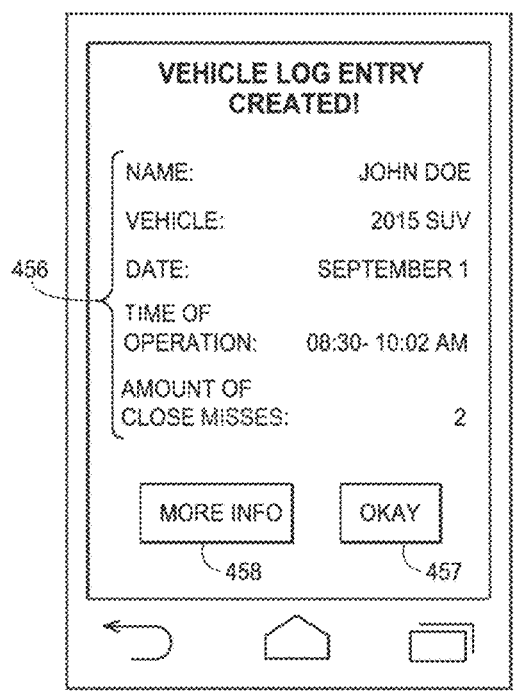

FIGS. 4A and 4B illustrate exemplary interfaces associated with assessing vehicle operation using detected or determined vehicle operation parameters. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely exemplary and that alternative or additional content is envisioned.

FIG. 4A illustrates an interface 450 associated with the identification of an individual depicted in image data. The interface 450 may include an information box 451 that identifies the individual (as shown: John Doe) and the vehicle (as shown: 2015 SUV). In embodiments, the electronic device may identify the individual and the vehicle using image data received when the individual is operating the vehicle. The interface 450 may include a "CANCEL" selection 452 that enables an accessing user to select to dismiss the interface 450 and a "NEXT" selection 453 that enables an accessing user to select to proceed to a subsequent interface.

FIG. 4B illustrates an additional interface 455 associated with a vehicle operation log. In some embodiments, the electronic device may display the additional interface 455 in response to the user selecting the "NEXT" selection 453. The interface 455 indicates that a vehicle log entry has been created, where the vehicle log entry may include a set of information 456. As illustrated in FIG. 4B, the set of information 456 may include a vehicle operator name (as shown: John Doe), the vehicle (as shown: 2015 SUV), a date (as shown: September 1), a time of operation (as shown: 08:30-10:02 AM), and an amount of close misses (as shown: 2). It should be appreciated that the interface 455 may include alternate or additional information. For example, the interface 455 may indicate which of the close misses are attributed to the vehicle operator. The interface 455 may also include an "OKAY" selection 457 that enables the user to select to dismiss the interface 455. Further, the interface 455 may include a "MORE INFO" selection 458 that enables the user to view more information, such as more detailed information associated with the two (2) identified close misses.

Figure 5:
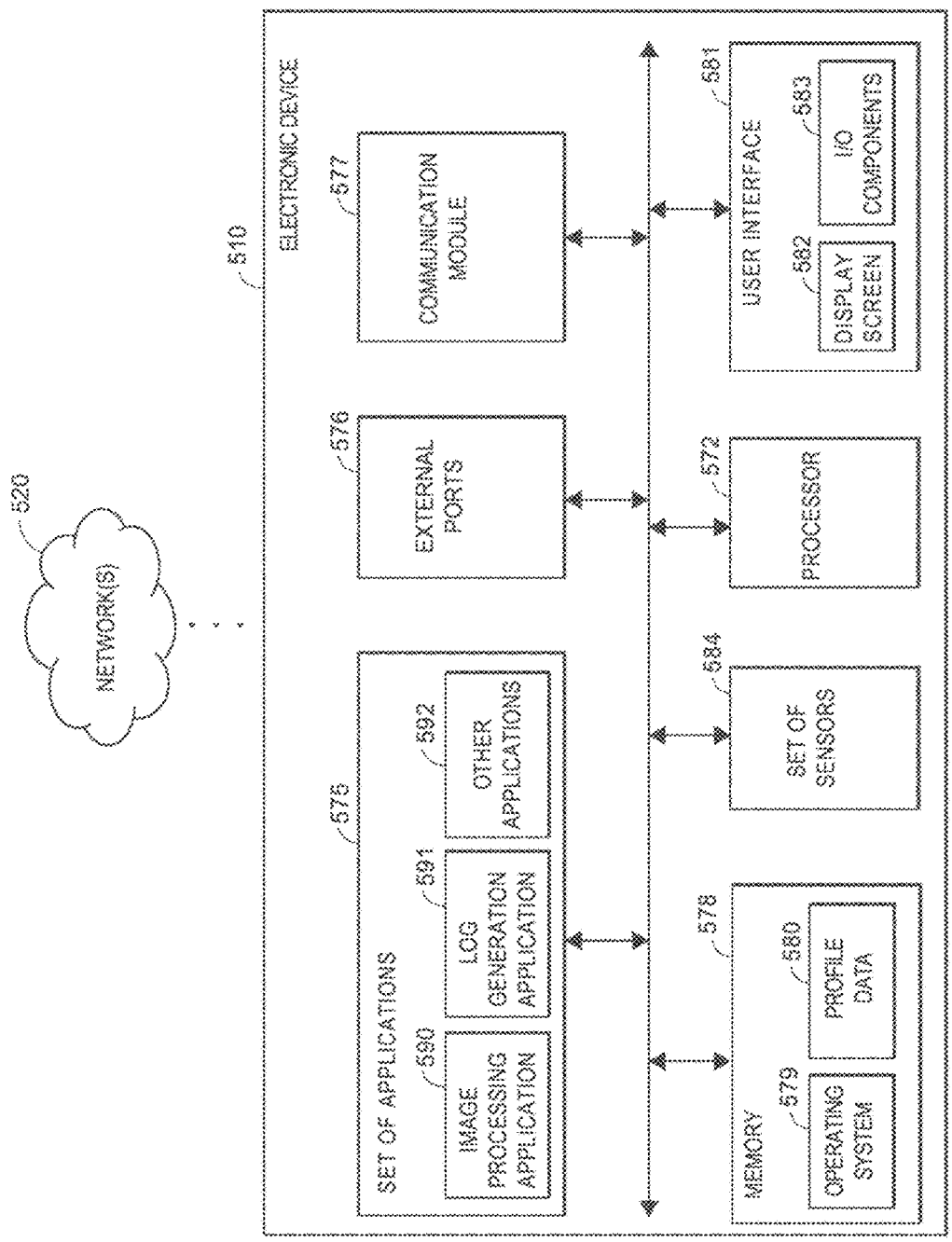
FIG. 5 is a block diagram of an exemplary electronic device, in accordance with some embodiments.

FIG. 5 illustrates a diagram of an exemplary mobile or other electronic device 510 (such as one of the electronic devices 110, 115 as discussed with respect to FIG. 1) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle.

The electronic device 510 may include a processor 522 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to identify individuals depicted in the image data, and a log generation application 591 configured to interface with sensors and generate vehicle operation logs that may include various vehicle operation parameters. It should be appreciated that one or more other applications 592 are envisioned, such as an application configured to determine whether a vehicle is traveling into a direction of the sun.

The processor 522 may interface with the memory 578 to execute the operating system 579 and the set of applications 575. According to some embodiments, the memory 578 may also include profile data 580 that may include data associated with a set of individuals associated with a vehicle. In some implementations, the image processing application 590 may interface with the profile data 580 to retrieve appropriate profile data and compare the profile data to received image data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, image data from a set of image sensors. For further example, the communication module 577 may transmit data to and receive data from a remote server via the network 520.

The electronic device 510 may further include a set of sensors 584. The processor 522 and the set of applications 575 may interface with the set of sensors 584 to retrieve and process the corresponding sensor data. The set of sensors 584 may include, for example, a location module, an accelerometer, a gyroscope, a compass, a weather sensors, one or more image sensors, various biometric sensors capable of sensing various biometric data as discussed herein, and/or the like. In one particular implementation, the log generation application 591 may use various data from the set of sensors 584 to generate vehicle operation logs.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of assessing operation of a vehicle by an, the method comprising:
   accessing (i) vehicle operation data associated with the operation of the vehicle, and (ii) operator data associated with the operator, the operator data indicating a set of conditions or movements of the operator;
   analyzing image data to identify the operator of the vehicle;
   identifying, from the vehicle operation data, a close miss experienced by the vehicle during the operation of the vehicle;
   identifying, from the operator data, a condition or movement of the operator that occurred prior to an occurrence time of the close miss; and
   based upon the condition or movement of the operator that occurred prior to the occurrence time of the close miss, attributing, via the processor, the close miss to the operator.

2. The computer-implemented method of claim 1, wherein accessing the vehicle operation data associated with the operation of the vehicle comprises:
   retrieving sensor data from at least one of: a yaw rate sensor, a tilt sensor, a steering angle sensor, a location module, and a brake sensor.

3. The computer-implemented method of claim 1, wherein accessing the operator data associated with the operator comprises:
   accessing at least one of: (i) biometric data associated with the operator, and (ii) image data indicating a movement or a position of the operator.

4. The computer-implemented method of claim 3, wherein accessing the image data comprises:
   accessing the image data from at least one image sensor.

5. The computer-implemented method of claim 1, further comprising:
   recording an indication of the close miss and an identification of the operator.

6. The computer-implemented method of claim 5, further comprising:
   transmitting, to a remote server, the indication of the close miss and the identification of the operator.

7. The computer-implemented method of claim 1, wherein identifying, from the vehicle operation data, the close miss experienced by the vehicle during the operation of the vehicle comprises:
   identifying, from the vehicle operation data, a plurality of close misses experienced by the vehicle during the operation of the vehicle.

8. The computer-implemented method of claim 1, wherein attributing the close miss to the operator is further based on an instance in which the vehicle operation data exceeds a predetermined threshold.

9. The computer-implemented method of claim 8, further comprising:
   accessing the predetermined threshold from a remote server.

10. A system in an electronic device for assessing operation of a vehicle by an operator, comprising:
    a memory configured to store non-transitory computer executable instructions; and
    a processor configured to interface with the memory, wherein the processor is configured to execute the non-transitory computer executable instructions to cause the processor to:
      access (i) vehicle operation data associated with the operation of the vehicle, and (ii) operator data associated with the operator, the operator data indicating a set of conditions or movements of the operator,
      analyze image data to identify the operator of the vehicle,
      identify, from the vehicle operation data, a close miss experienced by the vehicle during the operation of the vehicle,
      identify, from the operator data, a condition or movement of the operator that occurred prior to an occurrence time of the close miss, and
      based upon the condition or movement of the operator that occurred prior to the occurrence time of the close miss, attribute the close miss to the operator.

11. The system of claim 10, wherein to access the vehicle operation data associated with the operation of the vehicle, the processor is configured to:
    retrieve sensor data from at least one of: a yaw rate sensor, a tilt sensor, a steering angle sensor, a location module, and a brake sensor.

12. The system of claim 10, wherein to access the operator data associated with the operator, the processor is configured to:

access at least one of: (i) biometric data associated with the operator, and (ii) image data indicating a movement or a position of the operator.

13. The system of claim 12, wherein to access the image data, the processor is configured to:
access the image data from at least one image sensor.

14. The system of claim 10, wherein the processor is configured to execute the non-transitory computer executable instructions to further cause the processor to:
record an indication of the close miss and an identification of the operator.

15. The system of claim 14, wherein the processor is configured to execute the non-transitory computer executable instructions to further cause the processor to:
transmit, to a remote server, the indication of the close miss and the identification of the operator.

16. The system of claim 10, wherein to identify, from the vehicle operation data, the close miss experienced by the vehicle during the operation of the vehicle, the processor is configured to:
identify, from the vehicle operation data, a plurality of close misses experienced by the vehicle during the operation of the vehicle.

17. The system of claim 10, wherein the processor attributes the close miss to the operator further based on an instance in which the vehicle operation data exceeds a predetermined threshold.

18. The system of claim 17, wherein the processor is configured to execute the non-transitory computer executable instructions to further cause the processor to:
access the predetermined threshold from a remote server.

* * * * *